Aug. 11, 1925.
W. J. WILSON
MACHINE FOR MINING AND LOADING
Filed Dec. 19, 1921 2 Sheets-Sheet 1
1,549,701
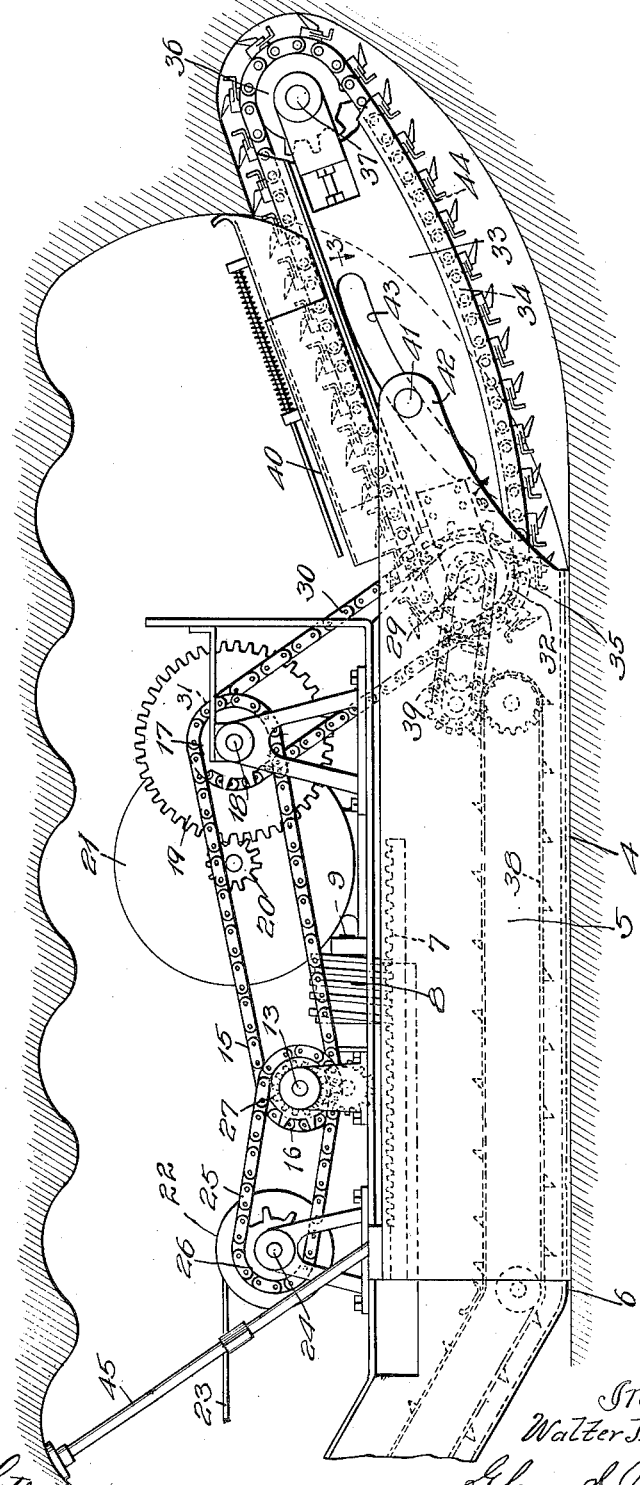
Witnesses:
W. F. Kilroy
Harry R. B. White
Inventor:
Walter J. Wilson
By Glenn S. Noble Atty.

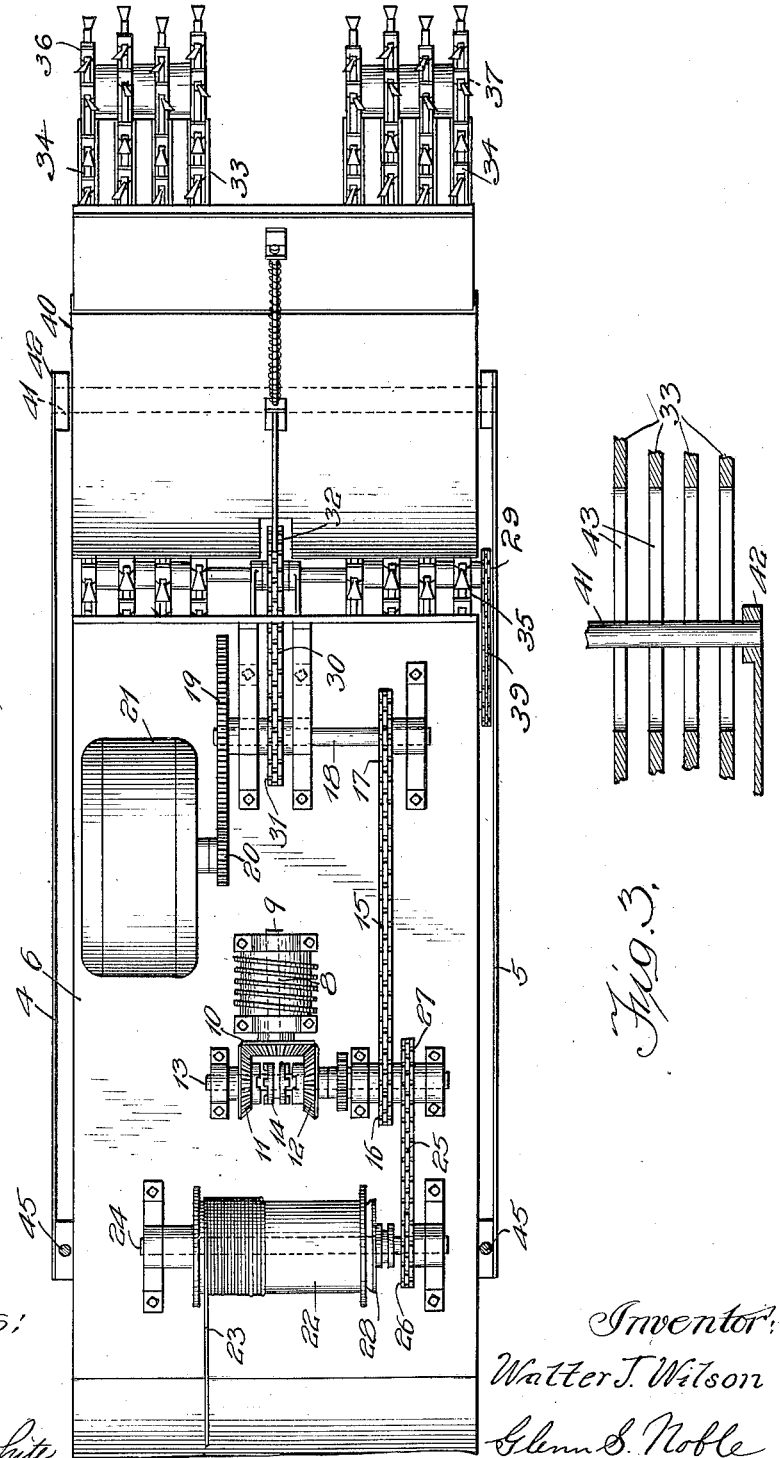

Patented Aug. 11, 1925.

1,549,701

UNITED STATES PATENT OFFICE.

WALTER J. WILSON, OF SEWICKLEY, PENNSYLVANIA.

MACHINE FOR MINING AND LOADING.

Application filed December 19, 1921. Serial No. 523,454.

*To all whom it may concern:*

Be it known that I, WALTER J. WILSON, a citizen of the United States, residing at Sewickley, in the county of Allegheny and State of Pennsylvania, have invented a new and useful Machine for Mining and Loading, of which the following is a specification.

While the machine which forms the subject of this invention may be adapted for mining various materials, it is particularly intended for mining coal and conveying and elevating the coal into cars.

The principal object of this invention is to provide an improved mining and loading machine which is adapted to mine or take out all the coal from a room, entry, or the like. Another object is to provide a machine of this character which will have a novel feeding arrangement for the cutter bars and other advantages and objects will appear more fully from the following description. In the accompanying drawings illustrating this invention:

Figure 1 is a side view showing the machine in operative position in a mine;

Figure 2 is a plan view; and

Figure 3 is a detail of the cutter arm guide taken on the line 3—3 of Figure 1.

The machine has a bottom pan or frame 4 with sides 5 between which is mounted a sliding frame or carriage 6. This carriage may be reciprocated by any suitable mechanism such as a rack 7 and worm 8. The worm is mounted on a shaft 9 which is supported in bearings on the carriage 6 and is driven by a gear 10 which engages with gears 11 and 12 on a transverse shaft 13. A double clutch 14 on this shaft provides means for driving either of these gears so that the movement of the worm may be reversed. The shaft 13 is driven by means of a chain 15 and sprockets 16 and 17 from a shaft 18 which in turn is driven by means of gears 19 and 20 by a motor 21.

A winding drum 22 is mounted on the carriage 6 and is provided with a cable 23 and serves for moving the machine, the entire machine being adapted to slide on the floor of a mine. The drum 22 is carried by a shaft 24 which is driven by a chain 25 and sprockets 26 and 27 from the shaft 13 and a suitable clutch 28 is provided for actuating the drum 22. A shaft 29 is mounted in the forward end of the carriage 6 and is driven from the shaft 18 by means of a chain 30 and sprockets 31 and 32. The cutter bars 33 are pivoted on the shaft 29 and carry the cutter chains 34 which chains are driven from the shaft 29 by sprockets 35 and are supported at the outer ends of the bars by means of guide sprockets or wheels 36. The guide sprockets are carried on shafts 37 which are carried in adjustable bearings in the ends of the bars. The cutter bars may be arranged across the full width of the machine so as to cut all of the coal in advance of the machine at one cut but in the present instance I have shown them arranged in two groups with a space between so that the machine will be swung sidewise after one cut has been made in order to cut out the intermediate material and complete the corresponding cut at the side. The chains are driven so that the top reaches move back toward the machine and carry the mined material back along the tops of the cutter bars to the rear ends of the bars where the material is discharged onto a conveyer 38 which extends along the lower part of the carriage and then back and upwardly so as to discharge the material into cars or the like. This conveyer may be driven in any suitable manner as by means of a chain 39 and suitable sprockets which connect it with the shaft 29, and any suitable means may be provided so that the conveyer may be stopped when desired. An adjustable guide or chute 40 is also provided for holding the cuttings or guiding them back to the conveyer.

One of the novel features of this invention is the arrangement provided for guiding the cutter arms as the cut is being made. This comprises a transverse guide bar or shaft 41 which is secured in the forwardly projecting portions 42 of the sides 5. This bar passes through slots 43 in the cutter bars 33, these slots being shaped so as to give the desired feeding movement or swinging of the cutter arms. In the present instance they are made somewhat arc shaped so that the cutter arms will be swung upwardly as indicated in Figure 1. The lower sides or edges of the cutter bars are preferably made somewhat curved or convex as shown at 44 while the upper edges are straight. The object of this is to cause more of the bits to come into engagement with the coal on the lower sides of the bars which will have a tendency to force the outer ends of the bars upwardly to give the desired feeding movement.

When the machine is brought into position at the face of the coal, it is held by jacks 45 and the carriage 6 is drawn backwardly so that the outer ends of the cutter arms are adjacent to the floor of the mine and they start cutting in this position. As the carriage is fed forwardly, the first or sumping cut is made which brings the forward ends of the cutter bars well into the coal. The preponderance of cutters at the lower edges of the arms tends to swing the arms upwardly and they are further forced or guided upwardly by the guide bar 41 in the slots 43. It will be noted that as the cutter bits move back from the outer ends of the bars they are cutting toward the face of the coal and will have a tendency to break or tear off large chunks of coal along the face so that the size of the cuttings is increased and the power required is also decreased. The adjustable chute 40 rides on the face of the coal and guides the cuttings back to the conveyer. When the upper cut has been completed, the cutter arms are again lowered and the operation repeated. While the final cutting tends to leave transverse ridges at the top of the mine, these may be removed by holding the cutter bars in raised position and then withdrawing the machine with the cutters operating in this position which will smooth off the roof of the mine.

This machine may be modified in various ways in order to adapt it for different mining conditions and it may also be operated in different ways, if desired, in order to secure the best results. What I claim and desire to secure by Letters Patent is:

1. A mining machine comprising a pan adapted to be moved on the floor of a mine, a transverse guide bar carried by said base, swinging cutter arms coacting with said bar for guiding them in their vertical movement and means for actuating said cutter arms.

2. A mining machine comprising a base, a carriage slidably mounted in said base, cutter arms pivotally mounted on said carriage and having guide slots therein, a guide bar mounted in the base and in engagement with said slots and means for actuating said arms.

3. In a mining machine, the combination of a base having upwardly extending side members, a carriage slidably mounted in said base, means for reciprocating said carriage, cutter arms pivotally mounted on said carriage, means for actuating said arms, and a guide bar secured to the sides of the base and engaging with slots in the arms for controlling the swinging movement of said arms.

4. The combination of a pan having upwardly extending sides, a carriage slidably mounted in said pan, means for sliding said carriage, a conveyer mounted in said carriage and adapted to convey material and discharge it into cars or the like, a motor, means for driving the conveyer from the motor, cutter bars pivoted at the front end of the carriage and having guide slots therein, a guide bar mounted in the sides of the pan and engaging with said slots, cutter chains on said arms and means for driving the chains whereby the material may be carried back to the conveyer.

5. In a mining machine, the combination of a base, a carriage mounted in said base, means for reciprocating said carriage, one or more cutter bars pivotally mounted on the carriage and adapted to swing in a vertical plane, a guide on the base, and a guideway associated with the cutter bars, the arrangement being such that the guide on the base will cooperate with the guideway of the cutter bars to cause the bars to swing in a vertical plane as the carriage moves with respect to the base.

6. In a mining machine, the combination of a pan, a carriage slidably mounted in said pan, means for sliding said carriage, a plurality of cutter bars pivotally mounted at the forward end of the carriage and adapted to swing in a vertical plane, a guide member on the pan, and guiding means on the bars adapted to coact with the guide member on the pan for swinging the cutter bars as the carriage slides along the pan.

7. The combination with a mining machine cutter arm, of a pivotal support for one end of said arm, said arm having a slot therethrough and a relatively fixed guide member engaging with said slot to control the movement of the free end of said arm as the arm is moved relatively to the guide member.

8. A chain cutter arm for a mining machine mounted to swing in a vertical plane, having a convex guiding surface on its lower side and a straight guide on its upper side whereby the outer end of the bar will be forced upwardly as it is fed into the coal.

9. In a mining machine, the combination of a support with one or more cutter bars mounted on said support and having straight upper guide surfaces and convex lower guide surfaces and cutter chains engaging with said bars.

10. A mining machine of the character set forth comprising a base adapted to slide on the floor of a mine, a carriage mounted in said base, a motor on said carriage, means connected with the motor for reciprocating the carriage, a conveyer mounted on said carriage, means for driving the conveyer from the motor, a winding drum and cable adapted to be actuated by the motor for moving the machine, two or more sets of vertically swinging cutter arms mounted at the forward end of the carriage, a guide mounted on said base which coacts with the cutter arms for swinging their outer ends when the carriage is reciprocated, cutter chains mounted on said arms, means for guiding the excavated material back along the tops of the arms to deliver it to the conveyer and means for actuating said cutter chains.

WALTER J. WILSON.